United States Patent
Briggs et al.

(10) Patent No.: US 6,852,801 B1
(45) Date of Patent: *Feb. 8, 2005

(54) ADHESIVES FOR BONDING COMPOSITES

(75) Inventors: Paul C. Briggs, Chapel Hill, NC (US); Masaki Minato, Hermosa Beach, CA (US); Samuel B. Osae, Cary, NC (US)

(73) Assignee: IPS Corporation, Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/634,316

(22) Filed: Aug. 5, 2003

Related U.S. Application Data

(62) Division of application No. 09/902,436, filed on Jul. 10, 2001, now Pat. No. 6,602,958.

(51) Int. Cl.⁷ ............................ C08L 9/00; C08L 33/04; C08L 33/14; C08L 35/02; C08L 41/00
(52) U.S. Cl. ....................... 525/212; 525/213; 525/222; 525/232; 525/239; 525/240; 525/241; 525/243
(58) Field of Search ................................ 525/212, 213, 525/222, 232, 239, 240, 241, 243

(56) References Cited

U.S. PATENT DOCUMENTS

| | | |
|---|---|---|
| 3,333,025 A | 7/1967 | Bader |
| 3,838,093 A | 9/1974 | Owston |
| 3,890,407 A | 6/1975 | Briggs, Jr. |
| 4,126,504 A | 11/1978 | Wolinski et al. |
| 4,182,644 A | 1/1980 | Briggs, Jr. et al. |
| 4,233,418 A | 11/1980 | Lingier et al. |
| 4,304,709 A | 12/1981 | Salee |
| 4,513,108 A | 4/1985 | Jones |
| 4,536,546 A | 8/1985 | Briggs |
| 5,206,288 A | 4/1993 | Gosiewski et al. |
| 5,340,901 A | 8/1994 | Wang |
| 5,548,056 A | 8/1996 | Chung |
| 5,935,711 A | 8/1999 | Pocius et al. |
| 6,291,593 B1 | 9/2001 | Cheng |
| 6,433,091 B1 | 8/2002 | Cheng |
| 6,602,958 B2 * | 8/2003 | Briggs et al. ............... 525/192 |

FOREIGN PATENT DOCUMENTS

| | | |
|---|---|---|
| EP | 376350 | 12/1989 |
| EP | 487058 | 11/1991 |

OTHER PUBLICATIONS

R.S. Drake and A.R. Siebert, Reactive Butadiene/Acrylonitrile Liquid and Solid Elastomers: Formulating Acrylic, Anaerobic and Radiation Curable Adhesives, "Adhesive Chemistry" Ed. Leing-Huang Lee, 1984.

* cited by examiner

*Primary Examiner*—Nathan M. Nutter
(74) *Attorney, Agent, or Firm*—Scott R. Cox

(57) ABSTRACT

An adhesive composition, including a mixture of about 1 percent to about 35 percent by weight of chlorinated polymer, about 1 percent to about 35 percent by weight of a nitrile elastomer, a rubber-modified acrylonitrile copolymer, or mixtures thereof, about 25 percent to about 90 percent by weight of an alkyl acrylate or methacrylate monomer and about 0.01 to about 30 weight percent of a core shell impact modifier.

36 Claims, No Drawings

ADHESIVES FOR BONDING COMPOSITES

REFERENCED TO RELATED APPLICATION

This application is a divisional application of application Ser. No. 09/902,436 filed on Jul. 10, 2001, now U.S. Pat. No. 6,602,958.

BACKGROUND OF INVENTION

1. Field of Invention

This invention relates to adhesives. More particularly, this invention relates to two-part room-temperature curing methacrylate based adhesives that are used to bond a wide variety of materials, including thermoset plastics, thermoplastics, metals, wood, ceramics and other materials and combinations of materials. This invention involves a significant improvement in the ability of adhesives to bond certain difficult-to-bond composite materials with minimum required surface preparation. Another feature of this invention is the high degree of elastic behavior of the cured adhesives and the ability of the cured adhesive materials to retain a high proportion of their elastic behavior after exposure to elevated temperatures or long-term aging.

2. Background Art

The three common classes of two-part room temperature curing reactive adhesives are epoxies, polyurethanes, and acrylics. The discussion of these prior art adhesives and the inventive adhesives emphasizes structural applications, wherein a very strong bond is achieved between two structural members of an assembly, and the bond is often strong enough to cause failure of the material before the assembly fails. However, all of these adhesive materials, can be and are used to advantage in less demanding applications, as well, in which case one or more of the advantages of the particular adhesive fulfills a specific bonding requirement.

Epoxy adhesives, which are the earliest, best known and among the most common structural adhesives in general use, consist of an epoxy resin adhesive component and an amine, polyamide, or combined amine and polyamide hardener components. Faster curing epoxies can be formulated with polymercaptan hardeners that are generally used in combination with polyamide and amine hardeners.

Polyurethane adhesives generally consist of an isocyanate-terminated polyol and a hardener or curative component that consists of a polyol or amine or a combination of polyols and amines.

The epoxy and polyurethane adhesives cure upon mixing when the hardener component reacts with the epoxy or polyurethane resin component in an addition polymerization process.

Methacrylate or acrylic adhesives that are used in the same applications as epoxies and polyurethanes generally consist of a polymer-in-monomer solution of an elastomer or thermoplastic resin or a combination thereof in a monomer such as methyl methacrylate. Hardening is achieved when a combination of a peroxide and an amine is introduced into the polymer-in-monomer mixture to initiate a free-radical curing reaction. Generally, the adhesive component contains either the amine or peroxide component and the co-reactive peroxide or amine component is mixed with the adhesive just prior to bonding.

Each of the three common reactive adhesive classes has characteristic advantages and disadvantages. For example, epoxies tend to be characterized as safe and relatively easy to mix and apply, but tend to be somewhat rigid and sensitive to cleanliness of the surface to be bonded. Polyurethanes are generally considered to be much more flexible and elastic, but also suffer from sensitivity to surface contamination, moisture and humidity. Both of these adhesive types have the limitation that fast-curing products tend to have very short open working time after mixing, and products with more acceptable open time have very long cure times. This limitation is imposed by the linear reaction mechanism that is characteristic of the addition polymerization reaction by which they cure.

In terms of the characteristics of the cured adhesive and resulting bond, epoxies are considered to be very strong because of their high modulus or rigidity and resulting high lap shear strength. They are generally recommended for bonding metals because of their affinity for metal surfaces and high shear strengths. However, their rigid nature limits their usefulness in applications that require flexibility in the adhesive bond. Epoxies also have limited ability to bond thermoplastic materials.

Polyurethanes are generally much more elastic, tough and flexible than epoxies. Elasticity, toughness and flexibility are beneficial when adhesive bonds are subjected to peeling or impact forces, and when bonds and bonded assemblies are subjected to dynamic fatigue stresses. However, polyurethanes are not as useful as epoxies for bonding metals, and are generally more suitable for bonding plastic materials in applications that are subjected to bending and impact stresses.

Two-part acrylic or methacrylate adhesives overcome two of the major drawbacks of the epoxies and polyurethanes. They are much more tolerant of unclean or unprepared surfaces, and they have a much more favorable cure profile in terms of open working time and cure rate. In addition, they exhibit equal or better affinity for metal and plastic surfaces than either epoxies or polyurethanes. However, some materials, in particular certain composite materials, are difficult to bond in the "as received" condition. Specific examples include certain gel coats, which are highly crosslinked and inert polyester compounds that form the outer or "show" surface of fiberglass reinforced polyester (FRP) composite materials used to fabricate boats and other structures exposed to outdoor weathering.

Other examples are closed molded polyester composites, which are materials formed by processes other than the open molded processes used to produce FRP composite structures. Examples of closed molding processes and materials are sheet molding compounds (SMC), resin transfer molded (RTM) composites and pultruded composites.

The essential issues with closed molded processes and products are (1) these processes produce polyester composite articles with reduced emission of and worker exposure to the styrene component in polyester resins and are rapidly replacing open molded processes, and (2) these materials are generally characterized by resistance to the solvating effect of the methacrylate monomers that normally soften or penetrate the bonding surface prior to hardening of the adhesive. In addition, many of these materials use processing aids to provide smooth surfaces for painting. These materials can also interfere with the bonding process.

Other materials are used to facilitate release from the molds used to fabricate parts from them. Such materials are often added directly to the molding compound, in which case they are referred to as "internal" mold releases. Other materials may be sprayed on to the mold surface prior to molding. These materials are referred to as "external" mold releases. All of these processing aids can interfere with the formation of strong adhesive bonds.

The problems experienced in bonding these materials with prior art methacrylate-based adhesives, as well as the additional and undesirable processing steps required to use them, including grit-blasting, sanding, solvent wiping and priming are described in detail in U.S. Pat. No. 3,838,093, which is discussed in further detail below.

Epoxy adhesives based on standard DGEBA (diglycidyl ether of bisphenol-A) resins, cured with hardeners based on combinations of amines, polyamides and other additives used to impart specific properties, have effectively been used to bond some closed molded composite materials. However these adhesives do not completely cure at room temperature, and generally require thermal post-curing to develop their full physical strength.

Recent developments in polyurethane adhesive technology have been directed toward improving adhesion to these composite materials as disclosed, for example, in U.S. Pat. Nos. 5,340,901 and 5,548,056. However, as with epoxy adhesives, these materials often require thermal post curing. Even though polyurethanes do ultimately develop their full physical strength at ambient temperatures, such post curing may be required to meet process speed requirements or to develop full, reliable or reproducible adhesion to the composite surface, or both. In some cases, solvent-based primers are used to develop adhesion at ambient temperatures, but this is undesirable for environmental and health reasons.

Yet another problem with the epoxy and polyurethane-based adhesives is their limited ability to bond to open-molded composite surfaces. Open-molded composite articles are fabricated by using a combination of spraying and rolling processes that combine woven and chopped fiberglass with polyester laminating resins in open molds. A mold in the shape of the article is first sprayed with a gel or outer coat of a highly crosslinked, pigmented resin that creates a smooth, shiny exterior or "show" surface. The laminating resin and glass are then applied together in successive applications until the desired part thickness is achieved. It is desirable to be able to de-mold the molded article as quickly as possible and move it on to the assembly area. At this point, and for several hours thereafter, the resin is not completely cured and is referred to as "green" as the final stage of the polymerization process proceeds. In this state, the exposed or "raw" resin surface is difficult or impossible to bond with conventional epoxy or polyurethane adhesives.

Thus, while epoxies and polyurethanes are sometimes capable of bonding the gel coat or show surfaces of these resin structures, in most cases it is necessary to bond the raw surface to itself or to the gel coat surface. Methacrylate adhesives have been increasing in popularity and usage because of their ability to bond the raw fiberglass surfaces, even in the green state. However, as improvements and changes have been made in the composition of the gel coat materials in recent years, the ability of the methacrylates to bond them, especially in the "as received" condition, has become less predictable.

A significant characteristic of some of the more recent acrylics or methacrylates is elasticity, toughness and flexibility that is greater than that of epoxies and even approaches that of the polyurethanes. However, not all of the methacrylate adhesives exhibit such elasticity, toughness and flexibility initially, and many of those that do often fail to retain these properties over a long period of time or when heated to elevated temperatures. Such reduction in elasticity can be demonstrated by comparing the bulk stress-strain properties of films prepared from the compositions which have not been exposed to elevated temperatures with similar films that have been subjected to brief or prolonged exposure at various temperatures. Loss of elasticity that occurs upon brief exposure at elevated temperatures may be the result of a continuation of the curing process, or a "post curing" process. It is also believed that certain physical changes in the phase distribution of the glassy and rubbery components or domains can occur in the cured composition when it is heated to or above its glass transition temperature or Tg. Loss of elasticity that occurs upon prolonged exposure to elevated temperature can also be the result of either the post curing or physical processes described above or the chemical degradation because of oxidative or other thermally induced reactions that adversely affect the polymer structure.

The improvements of this invention are primarily directed toward changes that occur as a result of post curing or physical changes after relatively brief exposures to elevated temperatures or longer exposures to ambient temperatures. Resistance to oxidative or other thermal degradation processes is subject to other chemical formulating principles well known to those skilled in the art.

Practical manifestations of these phenomena include the potential loss of the ability of adhesive bonds to resist peeling or impact forces as the bonded assembly ages, or a reduction in the elasticity or increase in hardness of the cured composition in the center portion of a thick cross section. The latter is believed to occur when the exothermal heat generated by the polymerizing composition raises the temperature to a level that approaches or exceeds the Tg of the cured composition. Whatever the cause of the physical changes that occur during or after the initial curing phase of the adhesive, the ultimate physical and elastic characteristics of the adhesive can generally be predicted by a brief exposure of the material in question at an elevated temperature. Typical thermal exposures for this purpose are from 30 minutes to a few hours at temperatures ranging from about 70 degrees centigrade to about 100 degrees centigrade.

As the use of adhesives increases in the fabrication of composite structures, design engineers are increasingly aware of the need to reliably predict the physical characteristics of the adhesives, which become an integral part of the structure. In this regard, adhesives are generally characterized by their tensile strength, modulus or stiffness, and elastic properties. In some cases, a stiffer adhesive is desired in order to provide a high degree of load bearing capability in the bonded joint. In other cases, a more flexible or elastic joint may be required in order to resist shock, vibration and fatigue loads. In civil engineering applications, such as highway bridge construction, a somewhat stiffer bond may be desirable. However, it is important that the adhesive also have a predictable degree of elastic behavior in order to withstand the bond stresses that occur as a result of thermal cycling and the resulting differential expansion of the bonded components. It is also necessary to withstand the cyclic loading of the structure imposed by vehicular traffic on the bridge. In extreme cases, seismic loads on civil engineering structures demand the utmost in stress to failure capability of the adhesive and the resulting joint.

In the fabrication of boats, on the other hand, more flexible adhesives are often desirable. An example is the bonding of stringers or liners in the structural fabrication of the boat hull. In this application, there can be a combination of severe shear, peel, and shock loading of the bonds when the boat is operated at high speeds over rough or choppy water. Flexible adhesives can provide very durable joints by resisting the peel and shock loads imposed on the bond and by damping the energy transferred to the joint as it undergoes cyclic loading.

In all of these cases, it is imperative that the adhesive be capable of retaining the physical characteristics, especially the ability to withstand shock and fatigue loads, during the lifetime of the structure. It is further important that the components of the adhesive can be adjusted to provide the desired degree of stiffness and flexibility for a variety of applications.

It is clear from the discussion above that there is a need for adhesives that will reliably and predictably bond a wide variety of composite surfaces in the as received condition, rapidly and without the application of heat to complete the cure or develop full adhesive bond strength. It is also desirable for such adhesives to bond other structural materials such as metal, thermoplastics, wood, etc. It is further desirable that such adhesives possess a high and predictable degree of elasticity and retain their elasticity when exposed to elevated temperatures during the curing process or in service.

The benefits derived from the improvements of this invention apply to structural adhesive bonding applications. However, the compositions disclosed herein may also be useful in a number of other applications for which epoxy, polyurethane, methacrylate and polyester resins are employed. One such application is coatings. A specific example of a coating is the driving surface of bridge decks, including FRP or composite bridge decks which may be fabricated and assembled using adhesives, including the adhesive compositions of the present invention. Such coatings are often referred to as bridge deck overlays.

FRP or composite bridges and bridge decks have been developed to replace traditional steel and concrete structures for a number of reasons, including their resistance to rust and decay in severe climates. Their light weight and high strength relative to steel and concrete structures make them especially useful for reconstructing aged, deteriorated bridge structures. Composite decks can be used to replace the existing concrete and steel deck of a deteriorated structure without replacing the entire structure. The light weight and equivalent or superior load-bearing capability of the composite deck allows the bridge to support the same traffic loads as the existing structure without replacing other deteriorated structural support members of the bridge.

Reconstructed bridges, as well as new and replacement bridges can be installed more quickly and with less traffic disruption than traditional bridges. Other benefits of this concept are too numerous to mention and beyond the scope of this invention. However, a common problem with these applications is the final step of replacing the pavement or driving surface of the bridge deck.

Existing bridge resurfacing materials are generally composed of polymer latex modified concrete or an aggregate composition that uses an epoxy resin or polyester resin as a binder for the aggregate and adhesive to secure the surface to the bridge deck. These materials were originally developed and have been used for resurfacing traditional concrete or asphalt bridge decks. Application of these materials to composite bridge decks has been less than satisfactory for a number of reasons, including mismatched coefficient of thermal expansion relative to the composite deck, insufficient toughness and flexibility, poor or marginal adhesion, and complexity in mixing and application.

The benefits of the present invention for adhesives, namely elasticity and toughness, and the retention of elasticity and toughness, combined with the ability to bond a number of surfaces, including difficult to bond composites, are useful for replacement of the driving surface of the bridge as well. Their toughness, flexibility and resistance to cracking also provide potential benefits for overlay coatings for restoration of existing concrete and asphalt bridge deck surfaces. In this case, the coating can perform both as a traffic wear surface and as a sealant to prevent intrusion of moisture, salt and other damaging elements that can damage the concrete and metal bridge structure beneath the pavement. For this application, it is imperative that the coating be resistant to cracking or any other loss of integrity that allows moisture or damaging agents such as deicing chemicals, oils or fuels to penetrate the coating. Such penetration can eventually lead to disbondment of the overlay and or damage to the structural components of the bridge deck and supporting structures.

U.S. Pat. No. 3,333,025 discloses improvements in the adhesive properties of polymerizable adhesives based on mixtures of methyl methacrylate monomer, styrene monomer, polychloroprene, and optionally an unsaturated polyester resin.

U.S. Pat. No. 3,838,093 describes problems associated with the bonding of fiberglass reinforced polyester (FRP) substrates with adhesives, including the adhesives of the '025 patent. It further discloses compositions of primers based on isocyanate and polyol components as primers, wherein the primers require volatile organic solvents in order to be effectively applied. It further discloses the requirement to cure the primer by allowing it to stand at ambient temperatures for up to 72 hours, or by baking the primed substrate in an oven at 200–280 degrees F.

U.S. Pat. No. 3,890,407 discloses methacrylate adhesives with improved adhesive properties comprising mixtures of chlorosulfonated polyethylene (CSPE) in methyl methacrylate (MMA) monomer. Among the compositions disclosed are mixtures of Hypalon 20 and Hypalon 30 CSPE in MMA with other additives to complete the adhesive formulations. Among the improvements cited are increased speed of cure, improved adhesion to unclean or unprepared surfaces, and high bond strength.

U.S. Pat. No. 4,126,504 discloses methacrylate monomer based adhesives containing a variety of polymers, including polychloroprene, chlorosulfonated polyethylene, and butadiene/acrylonitrile. It suggests that mixtures of such polymers may be employed, but does not cite or claim specific mixtures or combinations of polymers or suggest or disclose specific advantages obtainable through the use of such mixtures. In particular, it does not suggest mixtures of polychloroprene or chlorinated polyethylene polymers with butadiene-acrylonitrile polymers.

U.S. Pat. No. 5,206,288 discloses methacrylate adhesives based on mixtures of a number of elastomers blended individually with a core-shell impact modifier. These adhesives exhibit a high degree of toughness and flexibility, especially at low temperatures. Polychloroprene and butadiene-acrylonitrile elastomers are disclosed individually in combination with the core-shell impact modifiers, but there is no suggestion of employing blends of these elastomers in combination with the impact modifiers.

It has now been discovered that unique and highly beneficial adhesive characteristics can be achieved by blending chlorinated polymers such as polychloroprene, chlorinated polyethylene and chlorosulfonated polyethylene with butadiene-acrylonitrile elastomers and methacrylate monomers and free-radical catalysts to form polymerizable methacrylate adhesives. Such adhesives display excellent adhesion to difficult-to-bond composite surfaces, without the need for extensive surface preparation. Moreover, the adhesives exhibit a high degree of elasticity and retain their elasticity following exposure to heat.

SUMMARY OF INVENTION

The adhesives of the invention encompass a combination of about 1 to about 45 percent by weight, preferably from about 2 percent to about 35 percent by weight, most preferably from about 5 percent to about 25 percent by weight of a chlorinated polymer, preferably a chlorinated elastomer polymer, about 1 percent to about 45 percent, preferably from about 1 percent to about 25 percent, and most preferably about 1 percent to about 20 weight percent by weight of a nitrile elastomer, a rubber-modified acrylonitrile copolymer or mixtures thereof, and about 25 percent to about 90 percent by weight of an alkyl acrylate or methacrylate monomer, preferably a $C_1$ to $C_5$ alkyl acrylate or methacrylate monomer.

In a further preferred embodiment, the adhesives of the invention encompass a combination of about 1 percent to about 45 percent, preferably from about 5 percent to about 25 percent, of a chlorinated elastomer polymer, about 1 percent to about 45 percent, preferably from about 1 percent to about 25 percent of a nitrile elastomer, from about 0.01 to about 30 percent, preferably from about 0.01 to about 20 percent of a core-shell impact modifier in combination with a methacrylate monomer or a mixture of methacrylate monomers. The preferred monomers are $C_1$ to $C_5$ alkyl acrylate or methacrylate monomers which constitute from about 25 percent to about 90 percent by weight, preferably from about 40 percent to about 90 percent by weight, and most preferably, from about 50 percent to about 85 percent by weight of the composition. The most preferred monomer is methyl methacrylate monomer. Additional useful monomers are $C_6$ or higher methacrylate monomers which can constitute from 0.01 to about 25 percent, and preferably from 0.01 to about 15 percent of the composition. The compositions may also contain from 0 to about 15 percent, preferably from 0.01 to about 10 percent of a polymerizable organic acid monomer. The compositions are cured with a free radical generating catalyst system.

The preferred monomers of the invention are alkyl methacrylate monomers, but other monomers such as, for example, acrylate monomers may also be used to advantage in the compositions. Similarly, methacrylate or acrylate monomers other than alkyl methacrylates may be used in varying proportions to impart specific properties, as may be other compatible, polymerizable vinyl monomers including styrene and monomers derived from styrene.

The adhesive compositions of the inventions are characterized by their ability to bond a variety of composite materials, including certain difficult to bond composites with or without preparation of the surface prior to bonding, as well as a variety of other materials alone or in combination. The adhesives are further characterized by their high degree of elasticity and their ability to retain their elastic behavior after exposure to elevated temperatures or long term aging under ambient conditions.

DETAILED DESCRIPTION OF INVENTION

The essential feature of this invention is the use of a combination of a chlorinated polymer, preferably a chlorinated elastomeric polymer, and a copolymer of acrylonitrile with butadiene or isoprene, or a combination of butadiene and isoprene, as the elastomeric component of a methacrylate-based adhesive.

The preferred chlorinated elastomer polymers of this invention are polychloroprene, chlorosulfonated polyethylene, chlorinated polyethylene, other chlorinated hydrocarbon polymers, chlorinated rubber, epichlorohydrin polymers, or other polymers containing from about 20 to about 55 percent chlorine, and preferably from about 25 to about 45 percent chlorine. Examples of preferred chlorosulfonated polyethylene polymers are Hypalon 20, Hypalon 30, Hypalon 40, and Hypalon 48'. Examples of preferred chlorinated polyethylene polymers are Tyrin 3615, Tyrin 4211, and Tyrin 4215. Examples of preferred polychloroprene polymers are Neoprene AD-5, AD-10, AD-20, and other adhesive and non-adhesive grades of polychloroprene polymers. All of these preferred chlorinated polymers are available form DuPont Dow Elastomers among other commercial manufacturers.

Chlorinated polymers such as polyvinyl chloride (PVC) or vinyl chloride copolymers such as vinyl chloride/vinyl acetate copolymers may also be employed. Unmodified polyvinyl chloride is not readily soluble in the methacrylate monomers of this invention, but may be dispersed under conditions of high shear. The copolymers, on the other hand are readily soluble. Another useful method of incorporation of polyvinyl chloride polymers is the addition of nitrile elastomer/PVC blends. Such blends, which typically contain from about 20 percent to about 80 percent, and preferably from about 30 percent to about 70 percent nitrile elastomer are sold by Zeon Chemicals under the trade name Nipol. Specific examples are Nipol P-70, a 70/30 nitrile-PVC blend, and Nipol 503 Fl, a 50/50 blend.

The nitrile elastomer polymers of the instant invention are butadiene-acrylonitrile or butadiene-isoprene-acrylonitrile polymers with an acrylonitrile content from about 15 to about 50 percent, preferably from about 18 to about 45 percent. The remainder of the nitrile polymer backbone is typically butadiene or a combination of butadiene and isoprene. The glass transition temperatures ($T_g$) of the polymers range from about –50 to about 0 degrees C., and preferably from about –40 degrees C. to about –10 degrees C. Examples of such polymers include polymers available from Zeon Corporation, such as Nipol DN 401LL, Nipol DN 1201L, Nipol 1401LG, Nipol 1472 and Nipol DN 4555.

Certain rubber-modified acrylonitrile copolymers including acrylonitrile-butadiene-styrene (ABS) and methacrylate-acrylonitrile-butadiene-styrene (MABS) solution or molding grade resins are also useful components of this invention, but they usually are most effective when used in combination with butadiene-acrylonitrile or butadiene-isoprene-acrylonitrile elastomers. Solution grade or molding grade resins that are useful in conjunction with the chlorinated and nitrile elastomers of this invention typically contain from about 5 to about 50 percent, preferably from about 5 to about 30 percent butadiene, the remainder of the polymer primarily comprising styrene and acrylonitrile, or styrene, acrylonitrile and methyl methacrylate. Other styrenic or vinyl monomers may also be employed. The range of compositions of the polymers and a description of the various processes used to prepare them are described in U.S. Pat. No. 4,233,418.

One useful ABS resin is Blendex ADG-21 supplied by General Electric. It is a solution grade resin sold for the manufacture of solvent cements for ABS pipe. It contains about 35.5 percent acrylonitrile, about 7.5 percent butadiene and about 60 percent styrene. A useful MABS resin Terlux 2812 TR from BASF, a specialty clear grade sold for molding applications requiring a high degree of clarity and retention of physical properties. It has a density of 1.08 g/cc, tensile strength of 5,988 psi and tensile modulus of 278,200 psi. It is evident from the range of ABS and MABS polymers that are useful in this invention that these examples should not be limiting. For example, ABS and MABS solution and molding grade resins typically contain a substantial portion of free styrene acrylonitrile copolymer (SAN) copolymer, and thus the SAN copolymer is an effective component as well.

When used, these polymers are incorporated in amounts from 0.01 to about 30 percent, preferably from about 2 to about 25 percent of the adhesive composition.

Other polymeric materials may be used to advantage in the compositions of this invention. For example, core-shell impact modifiers may be used to impart desirable non-sagging Theological characteristics, and may also impart other desirable adhesive or mechanical property characteristics. Examples of such polymers are MABS, ABS, or MBS polymer impact modifiers of the core shell type. The MBS polymers are similar to those described in U.S. Pat. No. 4,304,709, which is hereby incorporated by reference. The MBS polymers are generally made by polymerizing methyl methacrylate monomer and styrene in the presence of polybutadiene or a polybutadiene copolymer rubber.

ABS and MABS impact modifiers are made by a similar process wherein the methyl methacrylate monomer is replaced by acrylonitrile or a combination of acrylonitrile and methyl methacrylate monomer, respectively. These polymers are described in U.S. Pat. No. 4,513,108 which is hereby incorporated by reference. An example of an ABS impact modifier is Blendex 338 produced by General Electric Company.

Another optional feature of this invention is the use of a mixed acrylate or methacrylate monomer composition. While the primary component of the monomers will be methyl or ethyl methacrylate or other acrylates or methacrylates with five or less carbon atoms in the alcohol portion, these monomers may be combined with longer chained monomers such as the $C_6$ and greater acrylates or methacrylates. The most preferred longer chain acrylates and methacrylates are dodecyl ($C_{12}$, also known as lauryl) and stearyl methacrylates, may be based on linear aliphatic alcohols. Other preferred monomers of this group are n-hexyl n-octyl, n-decyl, octadecyl, and other similar monomers with an aliphatic alcohol group of up to about 24 carbon atoms. The relative amounts of the short chain and long chain acrylate or methacrylate monomers that are used in the compositions depend upon the particular end use.

The longer chain methacrylate monomers generally increase the flexibility and toughness of the cured adhesive composition. They can also affect the adhesive characteristics of the composition by increasing or decreasing the affinity of the adhesive composition toward a particular substrate or group of substrates. In general, higher levels of methyl methacrylate provide higher modulus and stiffness and reduced toughness and flexibility. The amount of longer chain monomer is selected to achieve the desired level of flexibility and toughness, without unduly reducing stiffness and modulus Similarly, the amount of longer chain methacrylate monomer is selected in such a way as to achieve the desired adhesion characteristics without unduly and negatively affecting other desirable adhesive characteristics.

Another function of the long chain acrylic or methacrylate monomer is to extend the open time of the adhesive by reducing the volatility of the monomer mixture. To further extend the open time, natural or synthetic waxes may be added in amounts ranging from about 0.1 to 2 percent or more. The addition of such waxes further extends open time by acting as a barrier to reduce the rate of evaporation of monomer from the surface of the wet adhesive layer.

The preferred monomers of the invention are alkyl methacrylate monomers. However, acrylate monomers may also be used to advantage in the compositions. Similarly, methacrylate or acrylate monomers other than alkyl methacrylates may be used in varying proportions to impart specific properties. Examples of other useful monomers are hydroxyl substituted monomers such as hydroxyethyl and hydroxypropyl methacrylate and acrylate, tetrahydrofurfuryl acrylate and methacrylate, cyclohexyl methacrylate and methoxyethyl methacrylate. Difunctional crosslinking monomers and oligomers, including those derived from epoxy and polyurethane backbones can also be used to advantage in the compositions. The general selection of available monomers and oligomers is well known to those in the art and is reviewed in U.S. Pat. No. 5,935,711.

When used, the monomers, other than the $C_1-C_5$ alkyl acrylates and methacrylates, are added in amounts ranging from about 0.01 to about 25 percent of the polymer and monomer composition, preferably from about 0.5 to about 15 percent.

In order to further promote adhesion, especially to metals, the presence of a polymerizable acid such as methacrylic acid is preferred, in amounts ranging from about 0.01 to about 15 percent based on the total composition. Other useful polymerizable acids are acrylic acid, maleic acid, itaconic acid, and other copolymerizable unsaturated acids of this type that are well known to those skilled in the art.

In order to control the viscosity of the adhesive, various viscosity control agents such as organoclays, fumed silica or the like may be added in amounts ranging from about 0.1 to about 10 percent based on the system weight. Additional fillers may be added in significantly larger amounts to reduce the cost of the adhesive or to modify certain physical properties such as shrinkage and exotherm characteristics. In this case, quantity of the filler or extender would be considered separately as an additive to the base polymer and monomer composition as described above.

Common particulate fillers or extenders such as clay, talc, calcium carbonate, silica and alumina trihydrate can be added in amounts up to about 50 percent or more of the composition by weight in order to achieve specific economic, application or bonding characteristics. Inorganic or organic microspheres or microballoons may be used to reduce the density and cost of the adhesives, as well as to improve their sanding or finishing characteristics when used as repair materials such as automobile body repair products.

Any number of available and well-known catalysts may be chosen to cause the polymerization and curing of the compositions of the instant invention. The terms used to describe the various components of the curing system (catalysts, initiators, activators, promoters) are often used interchangeably, and thus the terminology used below may differ from other descriptions used in the art.

Generally, the catalyst chosen is a free radical generating catalyst. Examples of these catalysts are benzoyl peroxide, cumene hydroperoxide, tertiary butyl hydroperoxide, dicumyl peroxide, tertiary butyl peroxide acetate, tertiary butyl perbenzoate, ditertiary butyl azodiisobutyronitrile and the like. These free radical producing catalysts are used in amounts of about 0.01 to about 10 weight percent based on the weight of the adhesive composition. Preferably, the catalysts will be used in the amount of about 0.05 to about 5 weight percent.

Other components that promote or enhance the reactivity of the catalysts are initiators or activators and promoters. The initiators or activators are added in the amount of up to about 15 weight percent based on the weight of the adhesive. Preferred amounts are 0.01 to about 5 percent. Initiators and activators, which terms are often used interchangeably, include tertiary amines and aldehyde-amine reaction products. Useful tertiary amines include N,N-dimethylaniline, N,N-diethyltoluidine, N,N-bis(2-hydroxyethyl) toluidine and the like.

Aldehyde-amine reaction products include such compositions as butyraldehyde-aniline and butyraldehyde-butylamine derivatives whose active ingredient is a dihydropyridine (DHP) formed from condensation of three moles of aldehyde with one mole of amine. More recently, DHP-enriched versions of these compositions have been made available. One such material is Reillcat ASY-2, available from Reilly Industries, Inc. This catalyst or initiator system is most often used in combination with a sulfonyl chloride compound and a hydroperoxide as described in U.S. Pat. Nos. 3,890,407 and 4,182,644.

Compositions utilizing chlorosulfonated polyethylene, a hydroperoxide such as cumene hydroperoxide, and DHP as the catalyst/initiator system are generally mixed and applied in one of two ways. One is to include the chlorinated polyethylene and hydroperoxide along with all other adhesive components in a single polymer-in-monomer composition. The DHP can be applied to the bonding surfaces by brushing, rolling or spraying, which was the preferred method disclosed in the above-referenced '407 patent. The most popular current commercial method of use is to formulate a 1:1 mix ratio adhesive wherein the chlorosulfonated polyethylene and hydroperoxide are included in one polymer-in-monomer solution (the adhesive) and the DHP is added to another formulated polymer-in-monomer solution (the activator). The compositions disclosed in the examples can be utilized in either manner, but for convenience are shown as single solution blends in order to identify the proportions of the formulating components.

A promoter is an organic salt of a transition metal, such as cobalt, nickel, manganese or iron naphthenate, copper octoate, copper acetylacetonate, iron hexoate, or iron propionate. Promoters are used to enhance cure rate. Promoters, whose effect varies greatly from system to system are used in amounts up to about 1–2 weight percent, preferably about 1 part per million to about 0.5 weight percent. Most preferred amounts are from about 5 parts per million to about 0.5 percent by weight.

The most preferred free radical generating systems are (1) a tertiary amine reacting with benzyl peroxide or another peroxide or (2) a DHP derivative in combination with a sulfonyl chloride compound and a hydroperoxide to induce room temperature free radical curing.

The compositions of this invention have been developed primarily to improve the properties of adhesives. However, the improvements thereby discovered make these products more useful than previous products of their class for repair materials, coatings, bulk casting and any number of other applications beyond adhesives.

A specific example is the bridge deck overlay application discussed in the Prior Art. The preferred major components of this invention, namely poly (methyl methacrylate), nitrile polymers and elastomers, and chlorinated polymers and elastomers individually and collectively are inherently resistant to the adverse elements to which such overlays are exposed. Moreover, these components can readily be altered and adjusted in terms of amount and composition to optimize their adhesive, physical and chemical properties, all within the scope of this invention. All of these characteristics and benefits that are important for adhesives, including the ability to bond composites and a variety of other materials without surface preparation, and permanent retention of elastic properties, are applicable to a number of other applications, one example of which is bridge deck overlays.

EXAMPLES

MATERIALS AND COMPONENTS UTILIZED IN EXAMPLES

| Tradename or Designation | Description or Function | Source or Supplier |
|---|---|---|
| Neoprene | Polychloroprene elastomer | DuPont Dow Elastomers |
| Nipol ® | Nitrile elastomer | Zeon Chemicals |
| MMA | Methyl methacrylate monomer | INEOS Acrylics |
| PARALOID ® BTA 753MAA | MBS impact modifier | Rohm & Haas Co. |
| | Methacrylic acid monomer | INEOS Acrylics |
| DMT | N,N-Dimethyl-p-toluidine | First Chemical |
| HET | Hydroxyethyl toluidine | Bayer AG |
| 55% BPO Paste | Benzoyl peroxide (55%) in proprietary plasticizer mixture | Elf Atochem Akzo Nobel |
| IPS SS208/SS214 | Commercially available, proprietary benzoyl peroxide paste | IFS Corporation |
| Component B | | |
| BLENDEX ® ADG 21 | ABS solution grade resin | GE Plastics |
| Terlux ® 2812TR | Clear MABS molding resin | BASF |
| LMA | Lauryl methacrylate monomer | Sartomer |
| BLENDEX ® | ABS impact modifier | GE Plastics 338 |
| Tyrin ® | Chlorinated polyethylene | duPont Dow Elastomers |
| Hycar ® | Reactive liquid BD/AN polymer | Noveon, Inc. |
| Ricacryl ® | Reactive liquid butadiene polymer | Ricon Resins, Inc. |
| Kraton ® | Styrene/butadiene block copolymer | Kraton Polymers |
| HyTemp ® | Polyacrylate elastomer | Zeon Chemicals |
| Hypalon ® | Chlorosulfonated polyethylene | DuPont Dow Elastomers |
| Reillcat ™ ASY-2 | Dihydropyridine derivative | ReillyIndustries,Inc. |
| Luperox ® CU 90 | Cumene hydroperoxide (CHP) | Elf Atochem |

Test Substrates Utilized in Examples

The following is a generalized description of test substrates used for the evaluation of the adhesives of this invention. Specific details and identification of materials is provided in the specific examples.

| Designation | Description | Source |
|---|---|---|
| Steel | AISI 1020 cold rolled steel | Various |
| Aluminum | 6061-T6 or as otherwise specified | Various |
| ABS | Pipe grade, rigid, 0.25 inch sheet | Various |
| PVC | Type I rigid, 0.25 inch sheet | Various |
| Acrylic | Plexiglas ®, 0.25 inch sheet | Rohm & Haas |
| FRP | Open molded fiberglass reinforced polyester, inside or raw surface | As specified |
| Gel coat | Outside, glossy show surface of FRP composite, highly crosslinked | As specified |
| Closed molded composites | Polyester composite materials produced by methods other than the open molding process used to produce FRP composites | |
| SMC | Polyester sheet molding compound | As specified |
| Pultrusion | Test specimens cut form sheets or profiles from pultrusion process | As specified |

-continued

| Designation | Description | Source |
|---|---|---|
| | using polyester resin | |
| RTM | Resin transfer molded polyester | As specified |

Formulation and Mixing Procedures Utilized in Examples

Unless otherwise indicated, the following procedure was used, employing techniques well known in the art, to prepare the experimental adhesives:

Readily soluble or dispersible elastomers and resins were dissolved in methyl methacrylate (MMA) monomer in a jar or metal can on a laboratory roll mill to form stock solutions. The proportions of polymer and monomer were selected to provide a convenient working viscosity to allow the addition and blending of successive formulation ingredients. Typical solution concentrations in MMA of 15–35 percent by weight were selected to provide final solution viscosities ranging from 50,000 to 200,000 cps. It is generally preferable to prepare the stock solutions in the higher concentration and viscosity range in order to be able to make final viscosity adjustments by diluting the finished adhesive with MMA monomer. The polymer and monomer were rolled until all of the polymer was dissolved and no lumps or particles of undissolved material were present.

Experimental adhesives were prepared in plastic beakers in quantities ranging from 100–300 grams of finished adhesive. Sufficient stock solution or a mixture of stock solutions was added to the beaker in the quantity required to provide the desired proportion of elastomer in the finished adhesive.

When powdered impact modifiers were added to the formulations, they were added to the polymer in monomer solution along with any other non-catalytic liquid ingredients and mixed with a high shear laboratory mixer until a uniform, sometimes grainy paste consistency was achieved. The impact modifiers do not dissolve in the mixture, but rather swell to give the adhesive a gel-like consistency. Generally, two to four hours is required for the impact modifier to swell and soften sufficiently to be fully dispersed in the mixture. At this time, the adhesive is mixed a second time under high shear to form a smooth paste. At the end of the second mix, the remaining ingredients are added and thoroughly mixed into the adhesive.

Adhesives that do not contain an impact modifier were prepared by adding the remaining ingredients directly to the mixture of stock elastomer solutions and thoroughly mixed to form the finished adhesive. Final viscosity adjustments were made by adding with MMA monomer or fumed silica as required.

Preparation and Testing of Specimens from Examples Adhesive Bonds

Metal to metal lap shear bonds were prepared by bonding one inch by four inch test coupons with a nominal thickness of 0.060 inch to 0.063 inch. A layer of adhesive was applied uniformly to each mating substrate coupon such that the adhesive completely covered the one-inch by one half-inch area at the end of the specimen. The amount of adhesive is such that when the coupons are mated, there is sufficient excess that there is squeeze out around the entire perimeter of the bonded area to assure a fully bonded specimen.

The specimens were aligned in a metal fixturing mold in a parallel manner with one half-inch overlap with a uniform bond thickness of 0.006–0.010 inch, depending on the thickness of the coupon. Excess adhesive squeeze out was carefully removed without disturbing the bond while the adhesive was still liquid. The bonds were left undisturbed for sufficient time for the adhesive to cure.

The metal adhesive bonds were tested according to ASTM method D1002.

Adhesive lap shear bonds were prepared from plastic and composite samples, either bonded to themselves or to metal test pieces, by similarly applying adhesive to either one half square inch or one square inch areas at the end of each of two substrate pieces. The composite substrate pieces often vary in thickness. A nominal bond thickness was achieved by using stainless steel wire spacing shims, and strips of plastic to position the bonded specimens so that the specimens are aligned in a uniformly parallel manner.

The bonds were tested and the results reported according to ASTM method D5868.

In some cases, the thickness of the plastic substrates was such that the bonds were tested in compressive shear. Test specimens were cut and assembled according to test method D2564. The test method was modified in that following the application of adhesive to the test specimens, stainless steel wire shims were used to provide a bond line thickness of approximately 0.010 inch if the bonding surfaces were parallel and smooth. When bonding plastic specimens with rough or uneven surfaces, thicker wire spacers or some other method of maintaining an acceptable bond thickness was used. In any case, each example refers to the test method used as well as any treatment used to prepare the surfaces prior to bonding.

When reporting lap shear bond strength results, the following abbreviations are used throughout the examples for the corresponding failure modes:

AF: ADHESIVE FAILURE. The adhesive cleanly separates from the substrate surface.

CF: COHESIVE FAILURE. Failure occurs in the adhesive layer, leaving a distinct layer of adhesive on each substrate surface.

TLCF: THIN LAYER COHESIVE FAILURE. The failure appears to be adhesive in nature, with the bulk of the adhesive on one surface and a thin residue of adhesive on the other.

FT or DL: FIBER TEARING OR DELAMINATION of composite substrates.

SF: Fracture failure and separation of the composite substrate at the adhesive bondline, with no bond separation.

Bulk Tensile Properties of the Adhesive of the Examples

The improvements in the retention of elasticity of the compositions of this invention were determined by measuring the bulk stress-strain properties of the adhesive according to ASTM test method D638. Test specimens were prepared by mixing a sufficient quantity of adhesive to prepare a uniformly flat film of adhesive approximately 6 to 7 inches in diameter and 0.0625 inches thick. One of two methods was used to prepare mix the adhesive for the films.

In the first method, the adhesive components were combined in the specified ratios by simple hand mixing in a beaker. After the adhesive was thoroughly mixed, the beaker was placed in a vacuum chamber and vacuum was applied in an intermittent fashion to remove air until the last one or two applications of vacuum did not produce additional frothing or expansion. The adhesive was then transferred to one of two glass or plastic plates approximately 12 inches in diameter with a similar sized layer of Mylar release film on top of it. The adhesive was placed in the center of the film, and a mating Mylar film and plate were placed over the adhesive and pressed down uniformly to spread the film. Metal shims were placed around the perimeter of the plates to establish the desired film thickness.

In the second method, commercial or experimental adhesives were dispensed in the center of the film plates from commercial plastic cartridges, such as those sold by the Mix Pac Company, through a static mixer provided by the same manufacturer. Experimental adhesive components were individually degassed, as described above, prior to preparing the samples.

A variation of this method is to mix and degas the adhesive as indicated above and quickly transfer it to a single component caulking cartridge to dispense it on the film plates.

After the films were cured, the plates were removed. Test dumbbells were cut from the films as specified in the test method, taking care to cut the specimens from the most void-free section of the film. The films were allowed to cure for the indicated period of time at ambient temperature or at elevated temperatures as indicated in the examples prior to cutting the dumbbells. Each test number is the average of at least eight, and typically ten individual test specimens.

In the following examples, the adhesive components were prepared and mixed as indicated above. Unless otherwise specified, all indicated proportions are percent by weight.

EXAMPLE 1

The results in Table 1 illustrate the improvement in tensile properties of adhesive compositions, especially tensile elongation, through the addition of nitrile elastomers to adhesives containing polychloroprene or neoprene. Comparative Example 1A is a preferred prior art composition disclosed in U.S. Pat. No. 5,206,288, wherein the BTA 753 impact modifier contains approximately 70–80 percent polybutadiene, with a Tg of approximately −80° C. In Inventive Examples 1B and 1C, the total amount of elastomer or elastomer containing polymer is the same as that of Comparative Example 1A. In Inventive Example 1D, the total amount of elastomer is less than that of Comparative Example

TABLE 1

| EXAMPLE | Tg, ° C. | (Comparative) 1A | 1B | 1C | 1D |
| --- | --- | --- | --- | --- | --- |
| Neoprene AD-10 | −39 | 10.00 | 7.50 | 7.50 | 9.25 |
| Nipol DN 4555 | −10 | — | 7.50 | — | — |
| Nipol DN 401LL | est. −38 | — | — | 7.50 | 13.88 |
| MMA Monomer | | 64.50 | 64.50 | 64.50 | 71.37 |
| Paraloid BTA 753 | | 20.00 | 15.00 | 15.00 | — |
| Methacrylic Acid | | 5.00 | 5.00 | 5.00 | 5.00 |
| HET | | 0.50 | 0.50 | 0.50 | 0.50 |
| | | 100.00 | 100.00 | 100.00 | 100.00 |
| 55% BPO Paste | | 2.50 | 2.50 | 2.50 | 2.50 |
| Tensile Properties ASTM D638 24 Hours Room Temperature | | | | | |
| Stress at Failure (psi) | | 3777 | 3550 | 3645 | 3005 |
| Elongation (%) | | 179 | 183 | 219 | 122 |
| 24 Hours Room Temperature + 1 Hour at 82° C. | | | | | |
| Stress at Failure (psi) | | 4077 | 4437 | 4023 | 3209 |
| Elongation (%) | | 80 | 120 | 134 | 87 |

Inventive Examples 1B–1D illustrate a number of unexpected results. In Example 1B, a portion of the Neoprene, with a Tg of −35 degrees C., and BTA 753, with estimated polybutadiene content of 70 percent and Tg of −80 degrees C. is replaced with a nitrile polymer with a Tg of −10 degrees and a butadiene content of 55 percent. In spite of the overall reduction in the Tg of the elastomeric content and the polybutadiene content of Example 1B, it exhibits slightly higher initial tensile elongation and significantly higher retained elongation than the prior art Comparative Example 1A. This is unexpected. The composition of Example 1C, wherein the same proportion of total elastomeric component of Comparative Example 1A is replaced with a nitrile polymer with a low glass transition temperature and higher polybutadiene content provides even greater initial and retained elongation, even though the overall elastomer content is not increased. In Example 1D, the preferred BTA 753 component is entirely removed and replaced with a lesser amount of nitrile elastomer with similar butadiene content. In spite of this overall reduction in the level of elastomeric components, the cured composition remains more elastic than Comparative Example 1A following exposure to 82° C. for one hour.

EXAMPLE 2

The results in Table 2 illustrate improvements in tensile properties, especially tensile elongation, through the addition of nitrile elastomers to adhesives containing polychloroprene or neoprene and ABS impact modifier in place of an MBS impact modifiers. These examples also contain a long chain methacrylate monomer, lauryl methacrylate. Comparative Example 2A is similar to Comparative Example 1A above, except that the BTA 753, an MBS impact modifier has been replaced with Blendex 338, an ABS impact modifier with a similarly high polybutadiene content. The Inventive Examples are Examples 2B, 2C, 2D and 2E.

TABLE 2

| EXAMPLE | (Comparative) 2A | 2B | 2C | 2D | 2E |
| --- | --- | --- | --- | --- | --- |
| Neoprene AD-10 | 11.40 | 11.40 | 7.50 | 12.00 | 7.50 |
| Nipol DN 4555 | — | — | — | 5.67 | 7.50 |
| Nipol DN 401LL | — | — | 7.50 | — | — |
| BLENDEX ADG-21 | — | 20.00 | — | 11.33 | — |
| MMA Monomer | 58.10 | 58.10 | 59.50 | 68.00 | 59.50 |
| Lauryl Methacrylate | 5.00 | 5.00 | 5.00 | 5.00 | 5.00 |
| Blendex 338 | 20.00 | — | 15.00 | — | 15.00 |
| Methacrylic Acid | 5.00 | 5.00 | 5.00 | 4.00 | 5.00 |
| HET | 0.50 | 0.50 | 0.50 | 0.50 | 0.50 |
| DMT | — | — | — | 0.55 | — |
| Total | 100.00 | 100.00 | 100.00 | 100.00 | 100.00 |
| 55% BPO Paste | 2.50 | 2.50 | 2.50 | — | 2.50 |
| IPS SS214 Component B (Proprietary BPO Paste) | | | | 10:1 | |
| *Mix ratio by volume of adhesive and BPO paste. | | | | V/V* | |
| Tensile Properties ASTM D638 24 Hours Room Temperature | | | | | |
| Stress at Failure (psi) | 3565 | 3709 | 3304 | 2844 | 3511 |
| Elongation (%) | 176 | 65.7 | 184 | 147 | 145 |
| 24 Hours Room Temperature + 1 Hour at 82° C. | | | | | |
| Stress at Failure (psi) | 3857 | 3833 | 3771 | 2777 | 4086 |
| Elongation (%) | 60.1 | 29.8 | 112 | 151 | 63.1 |

Example 2C illustrates that the addition of a nitrile elastomer with low acrylonitrile content and low Tg provides considerable improvement over Comparative Example 2A. Example 2D illustrates that the combination of polychloroprene., a nitrile polymer with a high Tg and ABS solution grade resin can be formulated to provide excellent retention of elastic properties compared with the prior art.

EXAMPLE 3

The results in Table 3 illustrate significant improvements in the elongation of prior art adhesive compositions based on an MBS impact modifier and chlorinated polyethylene when a relatively small amount of a reactive liquid butadiene-acrylonitrile is added to the composition. The first example of each of 3A, 3B and 3C in a comparative example while the second and third examples of Examples 3B and 3C are Inventive Examples.

TABLE 3

| | EXAMPLE | | | | | | | | |
|---|---|---|---|---|---|---|---|---|---|
| | 3A | | | 3B | | | 3C | | |
| Tyrin 3611P 36% Cl | 12.00 | 12.00 | 12.00 | | | | | | |
| Tyrin 3615P 36% Cl | | | | 12.00 | 12.00 | 12.00 | | | |
| Tyrin 4211P 42% Cl | | | | | | | 12.00 | 12.00 | 12.00 |
| MMA Monomer | 69.60 | 67.10 | 64.60 | 69.60 | 67.10 | 64.60 | 69.60 | 67.10 | 64.60 |
| PARALOID BTA 753 | 18.00 | 18.00 | 18.00 | 18.00 | 18.00 | 18.00 | 18.00 | 18.00 | 18.00 |
| Hycar 1300X33 18% ACN | | 2.50 | | | 2.50 | | | 2.50 | |
| Hycar 1300X43 22% ACN | | | 2.50 | | | 2.50 | | | 2.50 |
| HET | 0.40 | 0.40 | 0.40 | 0.40 | 0.40 | 0.40 | 0.40 | 0.40 | 0.40 |
| Total | 100. | 100. | 100. | 100. | 100. | 100. | 100. | 100. | 100. |
| 55% BPO Paste | 2.50 | 2.50 | 2.50 | 2.50 | 2.50 | 2.50 | 2.50 | 2.50 | 2.50 |
| Tensile Properties ASTM D638 24 Hours Room Temperature + 1 Hour at 100° C. | | | | | | | | | |
| Stress at Failure (psi) | 3650 | 3648 | 3537 | 3291 | 3242 | 3261 | 4204 | 3848 | 3835 |
| Elongation (%) | 33.3 | 92.3 | 108 | 54.3 | 121 | 132 | 32.6 | 122 | 116 |

EXAMPLE 4

The results in Example 4 further illustrate that the nitrile group is important in the elastomeric components of the present invention in providing the advantages of increased elongation of the cured adhesives. As shown in Table 4, the addition of a liquid polybutadiene resin with no nitrile groups in the backbone does not provide as much increase in the initial elongation of compositions similar to those of Example 3. No heat aging tests were performed with these examples because of the relatively lower initial elongation.

TABLE 4

| EXAMPLE | 4A | 4B | 4C | 4D | 4E | 4F |
|---|---|---|---|---|---|---|
| Tyrin 3611P | 12.00 | 12.00 | | | | |
| Tyrin 3615P | | | 12.00 | 12.00 | | |
| Tyrin 4211P | | | | | 12.00 | 12.00 |
| PARALOID BTA-753 | 18.00 | 18.00 | 18.00 | 18.00 | 18.00 | 18.00 |
| MMA Monomer | 67.10 | 64.60 | 67.10 | 64.60 | 67.10 | 64.60 |
| Ricacryl 3500 | 2.50 | 5.00 | 2.50 | 5.00 | 2.50 | 5.00 |
| HET | 0.40 | 0.40 | 0.40 | 0.40 | 0.40 | 0.40 |
| Total | 100.00 | 100.00 | 100.00 | 100.00 | 100.00 | 100.00 |
| 55% BPO Paste | 2.50 | 2.50 | 2.50 | 2.50 | 2.50 | 2.50 |
| Tensile Properties ASTM D638 24 Hours Room Temperature | | | | | | |
| Stress at Failure (psi) | 4028 | 3734 | 3582 | 3633 | 4780 | 4881 |
| Elongation (%) | 48 | 44 | 71 | 61 | 46 | 61 |

EXAMPLE 5

The results in Table 5 further illustrate improvements in tensile elongation through the addition of solid nitrile elastomers to adhesives containing chlorinated polyethylene as the chlorinated polymer component of the adhesive composition. The elastomer blends are compared with a blend disclosed in Example 5A containing chlorinated polyethylene and an ABS impact modifier. The Inventive Examples are Examples 5A, 5B, 5C and 5D.

TABLE 5

| EXAMPLE | 5A | 5B | 5C | 5D |
|---|---|---|---|---|
| Tyrin 4211P | 12.00 | 12.00 | 12.00 | 12.00 |
| Nipol DN 1201L* | — | 15.00 | — | — |
| Nipol DN 1401LG | — | — | 15.00 | — |
| Nipol 401LL | — | — | — | 15.00 |
| MMA Monomer | 57.50 | 62.50 | 62.50 | 62.50 |
| Lauryl Methacrylate | 5.00 | 5.00 | 5.00 | 5.00 |
| Blendex 338 | 20.00 | — | — | — |
| Methacrylic Acid | 5.00 | 5.00 | 5.00 | 5.00 |
| HET | 50.50 | 0.50 | 0.50 | 0.50 |
| Total | 100.00 | 100.00 | 100.00 | 100.00 |
| 55% BPO Paste | 2.50 | 2.50 | 2.50 | 2.50 |
| Tensile Properties ASTM D638 24 Hours Room Temperature | | | | |
| Stress at Failure (psi) | 4736 | 3895 | 4594 | 3503 |
| Elongation (%) | 93.6 | 148 | 120 | 106 |
| 24 Hours Room Temperature + 1 Hour at 82° C. | | | | |
| Stress at Failure (psi) | 5330 | 4843 | 5111 | 3230 |
| Elongation (%) | 47.4 | 111 | 85.4 | 75.1 |

TABLE 5-continued

| EXAMPLE | 5A | 5B | 5C | 5D |
|---|---|---|---|---|

*Butadiene/isoprene/acrylonitrile terpolymer

Example 5B shows that a butadiene/isoprene/acrylonitrile terpolymer is especially effective in combination with the specific chlorinated polyethylene employed. It is noteworthy that the Nipol 401 LL, the nitrile elastomer with the highest butadiene rubber content (81%) and the lowest Tg (est. −38° C.) in the group, does not provide the greatest degree of elasticity. This provides additional confirmation of the importance of the nitrile content of the polymer blends in this invention.

EXAMPLE 6

The results in Table 6 demonstrate the application of this invention and improvement in elastic properties over the prior art with compositions based on chlorosulfonated polyethylene as the chlorinated polymer and employing cumene hydroperoxide and a dihydropyridine based activator component. Example 6A and 6B are Comparative Examples and Examples 6C and 6D are Inventive Examples.

TABLE 6

|  | (Comparative) | | | |
|---|---|---|---|---|
| EXAMPLE | 6A | 6B | 6C | 6D |
| Hypalon 30 | 10.00 | 10.00 | 7.50 | 7.50 |
| Nipol DN 4555 | — | — | 7.50 | — |
| Nipol DN 401LL | — | — | — | 7.50 |
| MMA Monomer | 66.50 | 71.50 | 64.50 | 66.50 |
| PARALOID KM 753 | 18.00 | 18.00 | 15.00 | 13.00 |
| Methacrylic Acid | 5.00 | — | 5.00 | 5.00 |
| Reillcat ASY-2 | 2.00 | 2.00 | 2.00 | 2.00 |
| Cumene Hydroperoxide | 0.50 | 0.50 | 0.50 | 0.50 |
|  | 100.00 | 100.00 | 100.00 | 100.00 |
| Tensile Properties ASTM D638 24 Hours Room Temperature | | | | |
| Stress at Failure (psi) | 3298 | 3476 | 3018 | 3290 |
| Elongation (%) | 107 | 128 | 171 | 168 |
| 24 Hours Room Temperature + 1 Hour at 82° C. | | | | |
| Stress at Failure (psi) | 5980 | 5644 | 5562 | 5321 |
| Elongation (%) | 44.4 | 24.4 | 68.4 | 70.3 |

When compared with the prior art examples 6A and 6B., examples 6C and 6D of the present invention show significant increases in initial elongation. They also retain significantly higher elongation after exposure to 1 hour at 820C.

EXAMPLE 7

The results in Table 7 compare the stress/strain properties of representative commercial methacrylate adhesives with those of the present invention with room temperature cure and following various heat cycles. While the heat cycles differ from sample to sample, the trends are evident. It is clearly shown that the adhesives of the present invention provide substantial improvements over the commercial products. Examples 6E and 6F illustrate the utility of ABS and MABS solution and molding grade resins in the compositions of this invention. Comparative Examples are Examples 7A, 7B, 7C and 7D and Inventive Examples are Examples 7E, 7F, 7G and 7H.

TABLE 7

|  | Comparative Examples | | | | | | | |
|---|---|---|---|---|---|---|---|---|
| EXAMPLE | 7A | 7B | 7C | 7D | 7E | 7F | 7G | 7H |
| COMMERCIAL ADHESIVES | | | | | | | | |
| 1) DHP Cure, 1:1 mix ratio general purpose structural methacrylate | ▼ | | | | | | | |
| 2) BPO Cure, 4:1 mix ratio methacrylate adhesive for metal | | ▼ | | | | | | |
| 3) BPO Cure, 10:1 mix ratio all purpose structural methacrylate | | | ▼ | | | | | |
| 4) 1:1 Mix ratio polyurethane adhesive for composites | | | | ▼ | | | | |
| FORMULATED ADHESIVES | | | | | | | | |

TABLE 7-continued

Comparative Examples

| EXAMPLE | 7A | 7B | 7C | 7D | 7E | 7F | 7G | 7H |
|---|---|---|---|---|---|---|---|---|
| Hypalon 30 | | | | | 7.50 | 11.79 | 11.79 | — |
| Neoprene AD-10 | | | | | — | — | — | 12.00 |
| Nipol DN 4555 | | | | | — | 7.40 | 7.40 | 5.67 |
| Nipol 401LL | | | | | 7.50 | — | — | — |
| Terlux 2812TR (MABS) | | | | | — | 3.30 | 3.30 | — |
| Blendex ADG-21 (ABS) | | | | | — | — | — | 11.33 |
| MMA Monomer | | | | | 66.50 | 66.57 | 59.09 | 68.00 |
| Lauryl Methacrylate | | | | | — | — | 7.50 | 5.00 |
| PARALOID KM 753 | | | | | 13.00 | 5.80 | 5.80 | — |
| Methacrylic Acid | | | | | 5.00 | 4.40 | 4.40 | 4.00 |
| Reillcat ASY-2 | | | | | 2.00 | 2.50 | 2.50 | — |
| Cumene Hydroperoxide | | | | | 0.50 | 0.36 | 0.36 | — |
| BHT | | | | | — | 0.36 | 0.36 | — |
| DMT | | | | | — | — | — | 0.55 |
| IPS SS214 Component B (Proprietary BPO Paste) | | | | | — | — | — | 10:1 V/V* |
| ASTM D638 24 Hours Room Temperature | | | | | | | | |
| Stress at Failure (psi) | 3688 | 1913 | n.t. | 2654 | 3290 | 3665 | 2330 | 2844 |
| Elongation (%) | 140 | 58.5 | n.t. | 62.6 | 169 | 179 | 232 | 147 |
| 24 Hours Room Temperature + Heat Cycle | | | | | | | | |
| Hours | 3 | 2 | 4 | 1 | 1 | 1 | 1 | 1 |
| Temperature ° C. | 59 | 93 | 70 | 100 | 82 | 82 | 82 | 82 |
| Stress at Failure (psi) | 5873 | 2593 | 2604 | 3849 | 5321 | 5069 | 3973 | 2777 |
| Elongation (%) | 36.9 | 26.3 | 32.5 | 62.7 | 70.3 | 112 | 165 | 151 |

*Mix ratio by volume of adhesive and BPO paste.

The results clearly show the substantial improvements in original and retained elongation of the adhesives of the present invention over the commercial methacrylate adhesives. It is also noteworthy that the retained elongation of all of the formulated methacrylate adhesives exceeds that of the commercial polyurethane, and that some far exceed the elastic properties of the polyurethane.

Examples 8 through 13 illustrate the unique ability of the compositions of this invention to bond a variety of composite materials, including difficult to bond closed molded composites, with minimal surface preparation.

EXAMPLE 8

Example 8 illustrates improvements in the ability to bond a commercial grade of sheet molded composite (SMC) used in the fabrication of buses. The performance of the improved adhesives of this invention was compared with (1) commercial methacrylate adhesives with a 10 to 1 mix ratio and (2) formulated adhesives individually containing polychloroprene and nitrile elastomers. See Table 8. Comparative Examples are Examples 8A–8E, and Examples 8F and 8G are Inventive Examples.

TABLE 8

| | (Comparative Examples) | | | | | | |
|---|---|---|---|---|---|---|---|
| EXAMPLE | 8A | 8B | 8C | 8D | 8E | 8F | 8G |
| 1) Competitive Methacrylate A Adhesive 12 Minute Cure Contains Chlorinated Polymer | ▼ | | | | | | |
| 2) Competitive Methacrylate B Adhesive 40 Minute Cure Contains Chlorinated Polymer | | ▼ | | | | | |
| 3) IPS SS 208 Methacrylate Contains Nitrile Polymer | | | ▼ | | | | |
| FORMULATED ADHESIVE | | | | | | | |
| Neoprene AD-10 | | | | 18.00 | — | 8.00 | 12.50 |
| Nipol DN 401LL | | | | — | 18.00 | 8.00 | 12.50 |
| MMA Monomer | | | | 77.01 | 77.01 | 77.01 | 70.90 |
| Methacrylic Acid | | | | 4.50 | 4.50 | 4.50 | — |
| HET | | | | 0.30 | 0.30 | 0.30 | 0.35 |
| DMT | | | | 0.11 | 0.11 | 0.11 | 0.11 |
| Fumed Silica | | | | — | — | 1.00 | 2.00 |
| Paraffin Wax | | | | | | | 0.65 |
| Disparlon 6200 (Organic Thixotrope) | | | | — | — | 1.25 | — |
| IPS SS208 Component B (Proprietary BPO Paste) | | | | | | | 10:1 V/V |
| Lap Shear Strength ASTM D5868 | | | | | | | |
| Surface Preparation: None Bond Thickness (in): 0.025 | | | | | | | |
| Shear Stress at | 543 | 742 | 282 | 448 | 534 | 762 | 936 |

TABLE 8-continued (Comparative Examples)

| EXAMPLE | 8A | 8B | 8C | 8D | 8E | 8F | 8G |
|---|---|---|---|---|---|---|---|
| Failure | | | | | | | |
| Failure Mode | AF | AF/FT | AF | AF | AF | FT | SF |
| | | | | | | 100% | |

When compared with commercial or formulated adhesives that individually contain chlorinated or nitrile polymers, but not the combination, examples 8F and 8G containing the blend show significant improvements in adhesion to the difficult substrate as evidenced by 100% fiber tearing bonds or complete failure of the composite specimen with no separation of the bond at all.

EXAMPLE 9

Example 9 illustrates improvements in the ability to bond a developmental grade of pultruded composite based on Reichhold polyester resin 31615. The performance of the improved adhesives of this invention was compared with commercial methacrylate adhesives with a 10 to 1 mix ratio. See Table 9. Examples 9A, 9B and 9C are Comparative Examples, and Example 9D is an Inventive Example.

TABLE 9

| | Comparative Examples | | | |
|---|---|---|---|---|
| EXAMPLE | 9A | 9B | 9C | 9D |
| 1) Competitive Methacrylate B | ▼ | | | |
| 2) Competitive Methacrylate C | | ▼ | | |
| Adhesive 20 Minute Cure | | | | |
| Contains Chlorinated Polymer | | | | |
| 3) IPS SS 208 Methacrylate | | | ▼ | |
| Contains Nitrile Polymer | | | | |
| FORMULATED ADHESIVE | | | | |
| Neoprene AD-10 | | | | 12.5 |
| Nipol DN 401LL | | | | 12.5 |
| MMA Monomer | | | | 66.9 |
| Methacrylic Acid | | | | 4.50 |
| HET | | | | 0.35 |
| DMT | | | | 0.11 |
| Fumed Silica | | | | 2.00 |
| Paraffin Wax | | | | 0.65 |
| IPS SS208 Component B | | | | 10:1 |
| (Proprietary BPO Paste) | | | | V/V* |
| Lap Shear Strength | | | | |
| ASTM D5868 | | | | |
| Surface Preparation | None | None | None | None |
| Bond Thickness (in) | 0.125 | 0.125 | 0.125 | 0.125 |
| Comparative | | | | |
| Shear Stress at Failure | 698 | 320 | 386 | 1177 |
| Failure Mode | AF/FT | AF | AF | 100% FT |

*Mix ratio by volume of adhesive and BPO paste.

As in Example 8, the adhesive of the present invention provides a much higher level of adhesion over the commercial adhesives that individually contain chlorinated or nitrile polymers, but not the combination.

EXAMPLE 10

Example 10 illustrates improvements in the ability to bond a commercial grade of pultruded composite used for an adhesively bonded gas pipeline repair system. The performance of the improved adhesives of this invention was compared with the commercial methacrylate adhesive supplied with the repair system. The surface of the composite is very shiny and inert, and difficult to bond with any adhesive without some degree of surface preparation. Light buffing with an abrasive pad that just removes the gloss is sufficient to promote adhesion, and this treatment was done with both adhesives tested. See Table 10. Examples 10A is a Comparative Example and Example 10B is an Inventive Example.

TABLE 10

| EXAMPLE | (Comparative) 10A | 10B |
|---|---|---|
| Commercial Repair Adhesive | ▼ | |
| FORMULATED ADHESIVE | | |
| Neoprene AD-10 | | 9.3 |
| Nipol DN 401LL | | 9.3 |
| MMA Monomer | | 77.3 |
| HET | | 0.35 |
| DMT | | 0.11 |
| Fumed Silica | | 2.00 |
| Paraffin Wax | | 0.65 |
| 55% BPO Paste | | 3.5 |
| Lap Shear Strength | | |
| ASTM D5868 | | |
| Surface Preparation | Buff | Buff |
| Bond Thickness (in) | 0.025 | 0.025 |
| Shear Stress at Failure | 1456 | 3409 |
| Failure Mode | CF | FT/CF |

In this case, it is possible to take advantage of the increased cohesive strength and improved adhesion capability of the present invention to provide a much higher stress to failure of the bond. This has the potential of increasing allowable service life or severity of service conditions of repairs utilizing bonded composite systems of this type.

EXAMPLE 11

Example 11 illustrates improvements in the ability to bond a commercial grade of SMC composite used in the manufacture of recreational vehicles. In the molding process, a liberal amount of Chemlease 41–90, a hydrocarbon-based mold release is used to prevent mold fouling and sticking. The residual mold release makes it especially difficult to bond the composite without surface preparation. The performance of the improved adhesives of this invention was compared with commercial methacrylate adhesives with a 10 to 1 mix ratio. In this example, the composite is bonded to aluminum, and the bond failure occurs at the composite surface or in the composite substrate. No known, commercially available adhesive is fully capable of reliably bonding this specific composite treated with the indicated mold release. See Table 11. Example 11A is a Comparative Example and Example 11B is an Inventive Example.

TABLE 11

| EXAMPLE | (Comparative) 11A | 11B |
|---|---|---|
| Commercial Adhesives A-C and IPS SS 208 | ▼ | |
| FORMULATED ADHESIVE | | |
| Neoprene AD-10 | | 12.5 |
| Nipol DN 401LL | | 12.5 |

TABLE 11-continued

| EXAMPLE | (Comparative) 11A | 11B |
|---|---|---|
| MMA Monomer | | 66.9 |
| HET | | 0.35 |
| DMT | | 0.11 |
| Fumed Silica | | 2.00 |
| Paraffin Wax | | 0.65 |
| 55% BPO Paste | | 4.50 |
| Lap Shear Strength ASTM D5868 | | |
| Surface Preparation | None | None |
| Bond Thickness (mils) | 0.125 | 0.125 |
| Shear Stress at Failure | 175–180 | 560 |
| Failure Mode | AF | FT (100%) |

As shown in Example 11B, a preferred composition of the present in invention provides greatly improved adhesion to this difficult surface and create a 100 percent fiber-tearing structural bond.

EXAMPLE 12

Example 12 illustrates improvements in the ability to bond aluminum with the adhesives compositions of this invention. The specific grade of aluminum tested (Examples 12A–12C) is used for the structural fabrication of busses in combination with the SMC sheet described in Example 8. It is important to be able to reliably bond the SMC and aluminum surfaces together in this application. The specific aluminum alloy is not known. It is referred to as "Ex. 8". For the purpose of this example, the aluminum is bonded to itself rather than the weaker SMC substrate to fully evaluate the strength of the aluminum bond. See Table 12. Examples 12A and 12B are Comparative Examples and Example 12C is an Inventive Example.

TABLE 12

| EXAMPLE | Comparative 12A | 12B | 12C |
|---|---|---|---|
| Competitive Methacrylate B | ▼ | | |
| IPS SS 208 Methacrylate FORMULATED ADHESIVE | | ▼ | |
| Neoprene AD-10 | | | 12.5 |
| Nipol DN 401LL | | | 12.5 |
| MMA Monomer | | | 66.9 |
| Methacrylic Acid | | | 4.50 |
| HET | | | 0.35 |
| DMT | | | 0.11 |
| Fumed Silica | | | 2.00 |
| Paraffin Wax | | | 0.65 |
| IPS SS208 Component B (Proprietary BPO Paste) | | | 10:1 V/V |
| Lap Shear Strength ASTM D5868 | | | |
| Surface Preparation: | | None | |
| Bond Thickness (in) | | 0.025 | |
| Shear Stress at Failure | 1302 | 1329 | 1999 |
| Failure Mode | AF | AF | CF |

It is clearly evident that the adhesive of the present invention provides greatly improved adhesion to the aluminum surface as evidenced by the higher bond strength and cohesive failure of the bond. This, combined with the improved adhesion to the mating SMC substrate exhibited in Example 8, illustrates the value of the adhesives of this invention for bonding difficult combinations of materials.

EXAMPLE 13

The results in Table 13 demonstrate the broad range of bonding capability of the adhesives of this invention.

TABLE 13

| FORMULA 13 | 13 |
|---|---|
| Hypalon 30 | 11.00 |
| Nipol DN 4555 | 4.00 |
| Terlux 2812TR | 6.00 |
| MMA Monomer | 63.70 |
| PARALOID KM 753 | 8.00 |
| Methacrylic Acid | 4.00 |
| Reillcat ASY-2 | 2.50 |
| Cumene Hydroperoxide | 0.40 |
| BHT | 0.40 |

All of the following substrates were bonded in the as received condition with no surface preparation prior to bonding.

| | C. R Steel | 6061 T6 Aluminum | Stainless Steel (304) | FRP/ Wood | Gel/ Wood | Gel/ Gel | ABS | PVC | Plexiglass |
|---|---|---|---|---|---|---|---|---|---|
| Lap Shear Strength ASTM D1002 | 3050 AF/CF | 258 AF | 2175 AF | | | | | | |
| Lap Shear Strength ASTM D5868 | | | | 301 SF (W) | 355 SF (W) | 583 FT (100%) | | | |
| Compressive Shear Strength ASTM D2564 | | | | | | | 1259 LCF | 3657 CF/TLCF | 3404 TLCF |

Gel coated FRP provided by Cruisers, Inc.
Wood = standard plywood.

The results show that the compositions of the present invention can be used to bond a variety of materials used in product assembly processes. In this case, the adhesive composition is one that emphasizes bonding capability with ferrous metals and a wide variety of non-metallic substrates, including plastics and other materials. When required, adhesion of compositions such as is shown in the formulation of Example 13 can be improved on aluminum, stainless steel and other metals through the use of surface treatments well known to those skilled in the art.

While the invention has been described in terms of various preferred embodiments, these should not be construed as limitations on the scope of the invention. Many other variations, modifications, substitutions and changes may be made without departing from the spirit thereof.

What is claimed is:

1. An adhesive composition comprising a mixture of about 1 percent to about 50 percent by weight of a chlorinated polymer, about 0.5 percent to about 45 percent by weight of a nitrile elastomer, a thermoplastic acrylonitrile copolymer or mixtures thereof, about 25 percent to about 90 percent by weight of an alkyl acrylate or methacrylate monomer, and about 0.01 to about 30 percent by weight of a core shell impact modifier.

2. An adhesive composition comprising a mixture of about 2 percent to about 40 percent by weight of a chlorinated elastomer polymer, about 0.5 percent to about 25 percent by weight of a nitrile elastomer, a thermoplastic acrylonitrile copolymer or mixtures thereof, about 40 percent to about 90 percent by weight of a $C_1$ to $C_5$ alkyl acrylate or methacrylate monomer, and about 0.01 to about 30 percent by weight of a core shell impact modifier.

3. An adhesive composition comprising a mixture of about 5 percent to about 30 percent by weight of a chlorinated elastomer polymer, about 0.5 percent to about 20 percent by weight of a nitrile elastomer, a thermoplastic acrylonitrile copolymer or mixtures thereof, about 50 percent to about 85 percent by weight of a $C_1$ to $C_5$ alkyl acrylate or methacrylate monomer, and about 0.01 to about 30 percent by weight of a core shell impact modifier.

4. The composition of claim 1, 2 or 3 in admixture with from about 0.01 up to about 25 percent by weight of a $C_6$ or higher acrylate or methacrylate monomer.

5. The composition of claim 1, 2 or 3 in admixture with from about 0.01 to about 15 percent by weight of a polymerizable organic acid monomer.

6. The composition of claim 1, 2 or 3 in admixture with a free radical generating catalyst system.

7. The composition of claim 1, 2 or 3 in admixture with a catalyst promoter.

8. The composition of claim 1, 2 or 3 in admixture with a $C_6$ or higher acrylate or methacrylate monomer and a polymerizable organic acid monomer.

9. The composition of claim 1, 2 or 3 in admixture with a $C_6$ or higher acrylate or methacrylate monomer and a free radical generating catalyst system.

10. The composition of claim 1, 2 or 3 in admixture with a free radical generating catalyst system and a catalyst promoter.

11. The adhesive composition of claim 1 wherein the chlorinated polymer comprises a polyvinyl chloride.

12. The adhesive composition of claim 1 wherein the chlorinated polymer comprises a polyvinyl chloride or a blend of a polyvinyl chloride and a nitrile elastomer.

13. The composition of claim 1, 2 or 3 wherein the chlorinated polymer is selected from the group consisting of polychloroprene, chlorinated polyethylene, chlorinated rubber, epichlorohydrin polymers, and non-sulfur containing polymers containing 20 to 55 percent chlorine and mixtures thereof.

14. The composition of claim 1, 2, or 3 wherein the core shell impact modifier is selected from MBS polymer impact modifiers, ABS polymer impact modifiers and MABS polymer impact modifiers.

15. The composition of claim 1, 2, or 3 wherein the core shell impact modifier comprises from about 5 to about 20 percent of the adhesive composition by weight.

16. The composition of claim 1, 2 or 3 wherein the core shell impact modifier comprises from about 5 to about 10% of the adhesive composition by weight.

17. The composition of claim 1, 2 or 3 wherein tensile elongation of the adhesive composition after curing for about 24 hours at ambient temperature followed by an additional curing of the composition for one hour at 82° C. is at least about 50 percent of tensile elongation of the adhesive composition after the initial 24 hour curing alone.

18. The composition of claim 1, 2 or 3 wherein tensile elongation of the adhesive composition after curing for about 24 hours at ambient temperature is at least about 100 percent and wherein the tensile elongation is at least about 50 percent following additional curing for one hour at 82° C.

19. The composition of claim 1, 2 or 3 wherein tensile elongation of the adhesive composition after curing for about 24 hours at ambient temperature is at least about 150 percent and wherein the tensile elongation is at least about 70 percent following additional curing for one hour at 82° C.

20. The composition of claim 1, 2 or 3 wherein tensile elongation of the adhesive composition after curing for about 24 hours at ambient temperature is from about 100 percent to about 200 percent and wherein the tensile elongation is from about 50 percent to about 150 percent following additional curing for one hour at 82° C.

21. The composition of claim 1, 2 or 3 wherein tensile elongation of the adhesive composition after curing for about 24 hours at ambient temperature is about 150 percent to about 250 percent and wherein the tensile elongation is about 75 percent to about 200 percent following additional curing for one hour at 82° C.

22. An adhesive composition comprising a mixture of about 1 percent to about 50 percent by weight of a non-sulfur containing chlorinated polymer, about 0.5 percent to about 45 percent by weight of a nitrile elastomer, a thermoplastic acrylonitrile copolymer or mixtures thereof, and about 25 percent to about 90 percent by weight of an alkyl acrylate or methacrylate monomer, wherein tensile elongation of the adhesive composition after curing for about 24 hours at ambient temperature followed by an additional curing of the composition for one hour at 82° C. is at least about 50 percent of tensile elongation of the adhesive composition after the initial 24 hour curing alone.

23. An adhesive composition comprising a mixture of about 1 percent to about 50 percent by weight of a non-sulfur containing chlorinated polymer, about 0.5 percent to about 45 percent by weight of a nitrile elastomer, a thermoplastic acrylonitrile copolymer or mixtures thereof, and about 25 percent to about 90 percent by weight of an alkyl acrylate or methacrylate monomer, wherein tensile elongation of the adhesive composition after curing for about 24 hours at ambient temperature is at least about 100 percent and wherein the tensile elongation is at least about 50 percent following additional curing for one hour at 82° C.

24. An adhesive composition comprising a mixture of about 1 percent to about 50 percent by weight of a non-sulfur containing chlorinated polymer, about 0.5 percent to about 45 percent by weight of a nitrile elastomer, a thermoplastic acrylonitrile copolymer or mixtures thereof, and about 25 percent to about 90 percent by weight of an alkyl acrylate or methacrylate monomer, wherein tensile elongation of the adhesive composition after curing for about 24 hours at ambient temperature is at least about 150 percent and wherein the tensile elongation is at least about 70 percent following additional curing for one hour at 82° C.

25. An adhesive composition comprising a mixture of about 1 percent to about 50 percent by weight of a non-sulfur containing chlorinated polymer, about 0.5 percent to about 45 percent by weight of a nitrile elastomer, a thermoplastic acrylonitrile copolymer or mixtures thereof, and about 25 percent to about 90 percent by weight of an alkyl acrylate or methacrylate monomer, wherein tensile elongation of the adhesive composition after curing for about 24 hours at ambient temperature is from about 100 percent to about 200 percent and wherein the tensile elongation is from about 50 percent to about 150 percent following additional curing for one hour at 82° C.

26. An adhesive composition comprising a mixture of about 1 percent to about 50 percent by weight of a non-sulfur containing chlorinated polymer, about 0.5 percent to about 45 percent by weight of a nitrile elastomer, a thermoplastic acrylonitrile copolymer or mixtures thereof, and about 25 percent to about 90 percent by weight of an alkyl acrylate or methacrylate monomer, wherein tensile elongation of the adhesive composition after curing for about 24 hours at ambient temperature is about 150 percent to about 250 percent and wherein the tensile elongation is about 75 percent to about 200 percent following additional curing for one hour at 82° C.

27. The adhesive composition of claim 22 comprising a mixture of about 2 percent to about 40 percent by weight of a non-sulfur containing chlorinated elastomer polymer, about 0.5 percent to about 25 percent by weight of a nitrile elastomer, a thermoplastic acrylonitrile copolymer or mixtures thereof, a thermoplastic acrylonitrile copolymer or mixtures thereof, and about 40 percent to about 90 percent by weight of a $C_1$ to $C_5$ alkyl acrylate or methacrylate monomer.

28. The adhesive composition of claim 23 comprising a mixture of about 2 percent to about 40 percent by weight of a non-sulfur containing chlorinated elastomer polymer, about 0.5 percent to about 25 percent by weight of a nitrile elastomer, a thermoplastic acrylonitrile copolymer or mixtures thereof, a thermoplastic acrylonitrile copolymer or mixtures thereof, and about 40 percent to about 90 percent by weight of a $C_1$ to $C_5$ alkyl acrylate or methacrylate monomer.

29. The adhesive composition of claim 24 comprising a mixture of about 2 percent to about 40 percent by weight of a non-sulfur containing chlorinated elastomer polymer, about 0.5 percent to about 25 percent by weight of a nitrile elastomer, a thermoplastic acrylonitrile copolymer or mixtures thereof, a thermoplastic acrylonitrile copolymer or mixtures thereof, and about 40 percent to about 90 percent by weight of a $C_1$ to $C_5$ alkyl acrylate or methacrylate monomer.

30. The adhesive composition of claim 25 comprising a mixture of about 2 percent to about 40 percent by weight of a non-sulfur containing chlorinated elastomer polymer, about 0.5 percent to about 25 percent by weight of a nitrile elastomer, a thermoplastic acrylonitrile copolymer or mixtures thereof, a thermoplastic acrylonitrile copolymer or mixtures thereof, and about 40 percent to about 90 percent by weight of a $C_1$ to $C_5$ alkyl acrylate or methacrylate monomer.

31. The adhesive composition of claim 26 comprising a mixture of about 2 percent to about 40 percent by weight of a non-sulfur containing chlorinated elastomer polymer, about 0.5 percent to about 25 percent by weight of a nitrile elastomer, a thermoplastic acrylonitrile copolymer or mixtures thereof, a thermoplastic acrylonitrile copolymer or mixtures thereof, and about 40 percent to about 90 percent by weight of a $C_1$ to $C_5$ alkyl acrylate or methacrylate monomer.

32. The adhesive composition of claim 22 comprising a mixture of about 5 percent to about 30 percent by weight of a non-sulfur containing chlorinated elastomer polymer, about 0.5 percent to about 20 percent by weight of a nitrile elastomer, a thermoplastic acrylonitrile copolymer or mixtures thereof, and about 50 percent to about 85 percent by weight of a $C_1$ to $C_5$ alkyl acrylate or methacrylate monomer.

33. The adhesive composition of claim 23 comprising a mixture of about 5 percent to about 30 percent by weight of a non-sulfur containing chlorinated elastomer polymer, about 0.5 percent to about 20 percent by weight of a nitrile elastomer, a thermoplastic acrylonitrile copolymer or mixtures thereof, and about 50 percent to about 85 percent by weight of a $C_1$ to $C_5$ alkyl acrylate or methacrylate monomer.

34. The adhesive composition of claim 24 comprising a mixture of about 5 percent to about 30 percent by weight of a non-sulfur containing chlorinated elastomer polymer, about 0.5 percent to about 20 percent by weight of a nitrile elastomer, a thermoplastic acrylonitrile copolymer or mixtures thereof, and about 50 percent to about 85 percent by weight of a $C_1$ to $C_5$ alkyl acrylate or methacrylate monomer.

35. The adhesive composition of claim 25 comprising a mixture of about 5 percent to about 30 percent by weight of a non-sulfur containing chlorinated elastomer polymer, about 0.5 percent to about 20 percent by weight of a nitrile elastomer, a thermoplastic acrylonitrile copolymer or mixtures thereof, and about 50 percent to about 85 percent by weight of a $C_1$ to $C_5$ alkyl acrylate or methacrylate monomer.

36. The adhesive composition of claim 26 comprising a mixture of about 5 percent to about 30 percent by weight of a non-sulfur containing chlorinated elastomer polymer, about 0.5 percent to about 20 percent by weight of a nitrile elastomer, a thermoplastic acrylonitrile copolymer or mixtures thereof, and about 50 percent to about 85 percent by weight of a $C_1$ to $C_5$ alkyl acrylate or methacrylate monomer.

* * * * *